Figure 1:
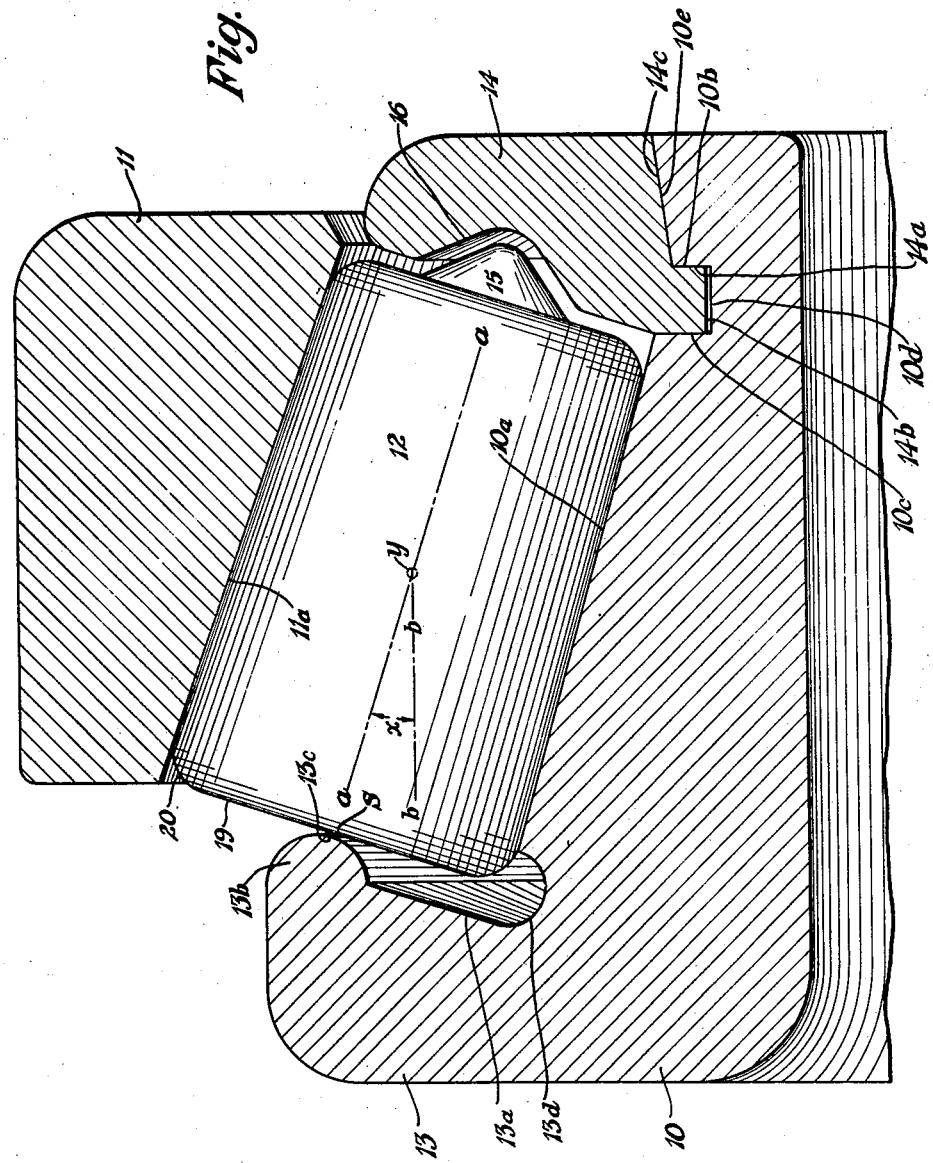

Feb. 26, 1935.    D. A. WALTERS    1,992,682
TAPERED ROLLER BEARING
Filed Nov. 21, 1931    3 Sheets-Sheet 1

Inventor
D. A. Walters
By Frease and Bishop
Attorneys

Feb. 26, 1935.  D. A. WALTERS  1,992,682
TAPERED ROLLER BEARING
Filed Nov. 21, 1931   3 Sheets-Sheet 3
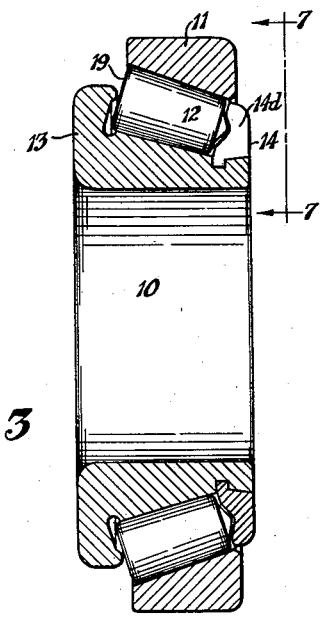
Fig. 3
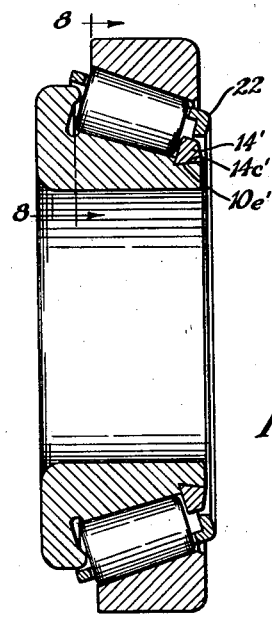
Fig. 5
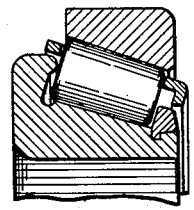
Fig. 6
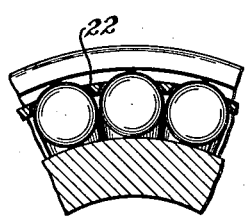
Fig. 7
Fig. 8
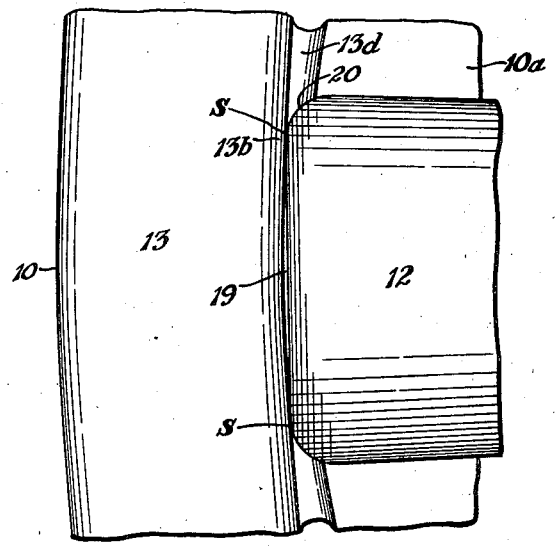
Fig. 4
Inventor
D. A. Walters
By Frease and Bishop
Attorneys Patented Feb. 26, 1935

1,992,682

UNITED STATES PATENT OFFICE 1,992,682

TAPERED ROLLER BEARING

David A. Walters, Canton, Ohio, assignor to Tyson Roller Bearing Corporation, Massillon, Ohio, a corporation of Delaware Application November 21, 1931, Serial No. 576,507

10 Claims. (Cl. 308—214)

The invention relates to roller bearings, and particularly to a construction of tapered roller bearings designed to prevent the rollers from falling away from the cone, and to maintain the rollers in alignment during operation of the bearing, with a minimum amount of resistance and friction between the larger ends of the rollers and a thrust flange.

For many years past, roller bearing manufacturers and engineers have been obsessed with the idea that the rollers of tapered roller bearings must be contained in a cage which rotates with the rollers between the cup and the cone for the purpose of keeping the axes of the rollers directed to the common apex of all the cones; and, as far as applicant is advised, every tapered roller bearing in commercial use today, excepting only those made in accordance with the Frank Tyson Patent No. 1,851,551, dated March 29, 1932, is provided with a cage of some sort to retain the rollers.

In the operation of such roller bearings, there is a continual friction contact between one side or another of each roller and the adjacent portion of the cage, depending upon the direction of rotation of the bearing. Moreover, tapered rollers in operation in a bearing continually tend to slip out radially, the end thrust causing a continual end friction between the roller and the thrust flange of the bearing, tending to deflect the axis of the roller away from its proper position.

The frictional contact between each roller and the cage is thus increased, each roller grinding the adjacent rib or bar of the cage into a longitudinally convex surface, upon which the rollers pivot at points intermediate their ends and continually rock back and forth during the operation of the bearing.

Roller bearing engineers have for years endeavored to overcome this slipping or rocking, of the individual rollers out of alignment, by providing for separated points or surface contacts between the ends of the rollers and the thrust flange; and in all such efforts, aside from the Tyson improvement, the contact between the roller and the thrust flange has been limited to points, lines or surfaces within the conical locus of the axes of revolution of the rollers, and, more important, within the cylindric locus of a line through the center of gravity of the rollers parallel with the axis of the bearing; and such a contact provides no means for preventing the individual rollers from falling away from the cone of the bearing.

The object of the present improvement is to provide cageless tapered roller bearings in which the individual rollers are substantially in contact with each other, thus eliminating the friction between the rollers and a cage, and utilizing the proximity of each roller to another to maintain the true axial alignment thereof.

A further and very important object of the improvement is to provide a roller bearing of this type in which the rollers contact with the thrust flange outside of the cylindric locus of a line through the center of gravity of the rollers parallel with the axis of the bearing; the thrust flange being generally in the form of a hollow, concave or reentrant cone, thus maintaining the rollers against falling, or being thrown away by centrifugal force, from the cone or inner race.

A still further object is to provide for surface or spot contacts with the thrust flange substantially in the conical locus of the axis of rotation of each roller at a maximum radial distance from the axis of the roller, thus giving the greatest resistance to a lateral deflection of the roller from the true axial alignment thereof; and at the same time reducing the frictional resistance of the thrust flange to a minimum.

In other words, these objects of the improvement are to provide a contact between the larger ends of the rollers and the thrust flange, which provides a maximum steadiness of the rollers with a minimum amount of frictional resistance.

The above and other objects, which will appear from an inspection of the accompanying drawings and the following detailed description of the invention, may be attained by providing a tapered roller bearing comprising a cone having a thrust flange with a curved face annular rib protruding inward from its rim and being rigidly connected to the larger end of the bearing cone, each roller preferably having a peripheral edge of its larger flat end rounded as upon a radius and adapted to contact with the crest of the rib of the thrust flange at spaced spots or surfaces substantially in the conical locus of the axes of rotation of the rollers, and on opposite sides of a plane of the axes of the bearing and the roller, these spots or surfaces of contact being in the line of tangency between the flat end of the roller and the rounded edge thereof and also tangent to the curved crest of the rib projecting from the rim of the flange; the rollers being spaced apart only some two-thousandths of an inch, so as to be substantially in contact with each other, whereby they may be retained in proper position between the cup and cone without the use of a cage of any description.

A further object of the invention is to provide a detachable retaining ring for the smaller end of the rollers, which may be readily placed and secured in position without the use of bolts, keys, or other separate locking devices.

An embodiment of the invention thus briefly described, is illustrated in the accompanying drawings, in which—

Figure 2:
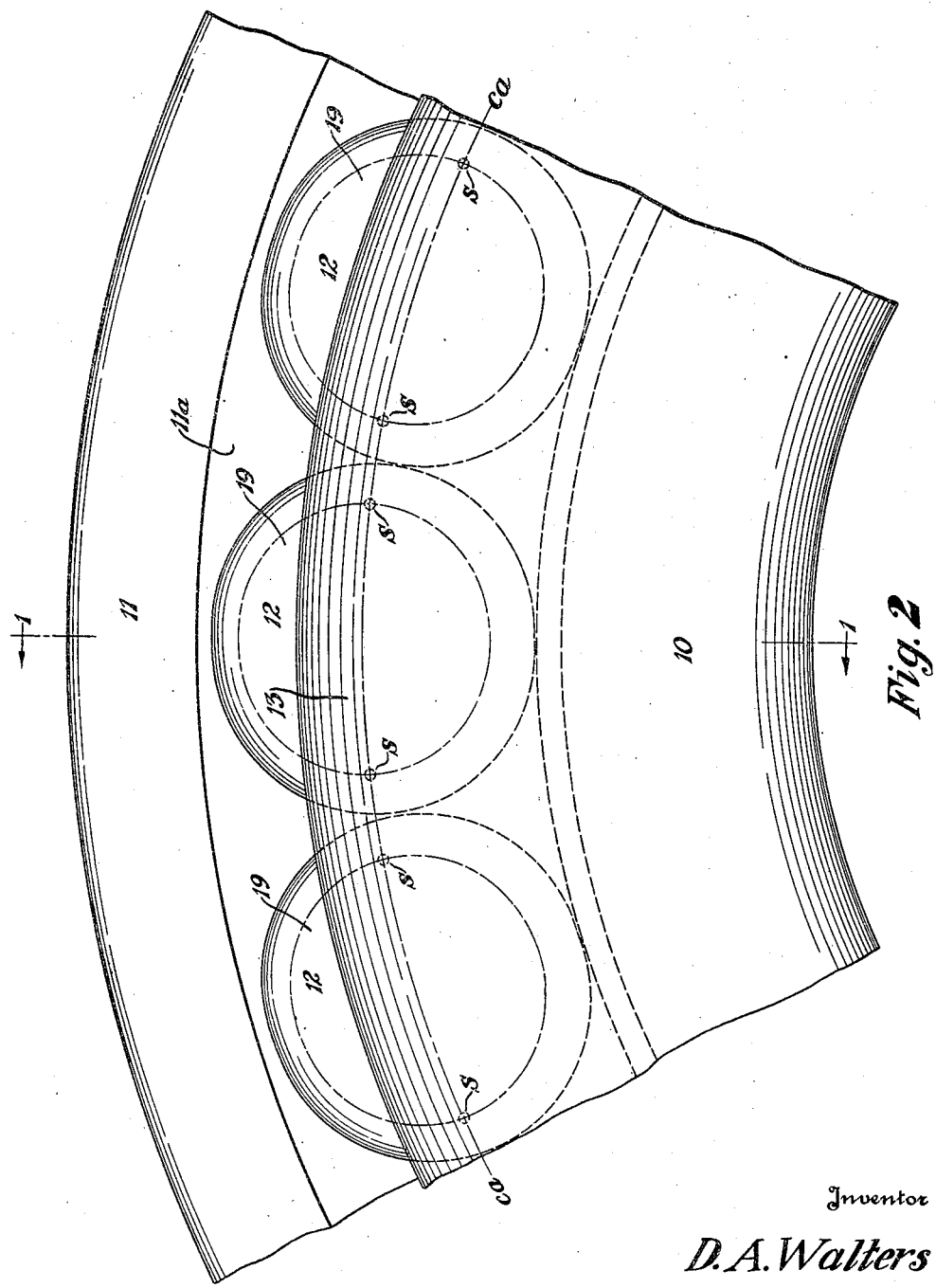

Figure 1 is a transverse section through one side only of a cone and a cup of a bearing constructed in accordance with the invention, as on line 1—1, Fig. 2;

Fig. 2, a fragmentary end elevation of a portion of a roller bearing constructed in accordance with the invention;

Fig. 3, a longitudinal axial sectional view of a bearing constructed in accordance with the invention, showing a transverse section through both sides of the cone and cup thereof, and showing the preferred form of retaining ring;

Fig. 4, a fragmentary peripheral view of a portion of the cone, showing one roller only in contact with the rib on the thrust flange thereof;

Fig. 5, a longitudinal axial sectional view of a bearing constructed in accordance with the invention, showing the same adapted for use with a cage and a modified form of retaining ring;

Fig. 6, a transverse section through one side only of the cone and cup of the bearing shown in Fig. 5, showing the preferred form of retaining ring;

Fig. 7, a fragmentary inner end view of a portion of a bearing showing the severed ends of the preferred form of retaining ring, as on line 7—7, Fig. 3; and Fig. 8, a fragmentary section through the cone, as on line 8—8, Fig. 5.

Similar numerals refer to similar parts throughout the drawings.

The improved roller bearing includes generally the cone 10, cup 11, and rollers 12 mounted for rotation upon and between the inner and outer raceways 11a and 10a respectively of the cup and cone; and a thrust or abutment flange 13 with its inner side in the form of a reentrant or hollow cone 13a being rigidly connected to, or formed integrally with, the larger end of the cone 10, and a retaining ring 14 being secured on the smaller end of the cone to retain the rollers assembled upon the cone when the cup is removed.

In order to properly retain the rollers assembled upon the cone when the cup is not in position, each roller is preferably provided at its smaller end with a conical pintle 15 adapted to be received within the annular groove 16 in the retaining ring 14.

The larger end of each roller is preferably provided with a flat face 19, and the peripheral edge thereof is curved upon a comparatively small radius, as shown at 20. The flat end face 19 is in a plane perpendicular to the longitudinal axis $a$—$a$ of the roller, and each element of the reentrant or concave cone surface 13a is preferably located substantially at right angles to an intersecting axis of any of the rollers.

A curved face annular rib 13b is formed on and projects inward from the rim of the inner side 13a of the retaining flange 13, and the curved crest of the rib 13c is substantially tangent to the flat end of the rollers 12 and is located substantially in the conical locus of rotation of the axis $a$—$a$ of the roller.

The parts are so proportioned and arranged that the inwardly projecting rib 13b holds the larger ends of the rollers a substantial distance away from the reentrant or hollow cone inner face 13a of the flange 13; and an annular groove 13d is preferably provided at the inner angle of the flange and the cone, so that the contact of the larger end of each roller is limited to the crest 13c of the curved face of the annular rib 13b on the thrust flange.

When the flat end 19 of a roller is abutted against the crest 13c of the curved rib 13b, it will contact with the same in spots or surface on opposite sides of the plane through the axes of the bearing end of the roller, substantially in the conical locus of the axis of rotation of the rollers, the conical locus of whose trace is indicated by broken lines $ca$—$ca$ in Fig. 2.

The spots or surfaces of contact between the end of each roll and the crest of the curved face rib, which are indicated at S in Fig. 2 of the drawings, are spaced further apart, and each one is at a greater distance from the center of the end of the roll, as compared with a location either outside or inside of the conical locus of rotation of the axis of the roll; and for that reason they give the maximum resistance to a lateral deflection or displacement of the roll from its true axial alignment, and at the same time give a minimum of frictional resistance in the contact of the end of the roll against the thrust flange, as compared with prior art devices.

Under certain conditions, as for instance, in small bearings having light weight rolls in which the axis of the roll is at a comparatively small angle to the axis of the bearing, and when a very high speed of rotation is required, it may be desirable, if not necessary, to have spots of contact between the roll and the thrust flange located outside of the conical locus of the axes of rotation of the rolls, with or without spots of contact inside thereof.

But in larger bearings having heavy weight rolls in which the axis $a$—$a$ of the roll is at a considerable angle $x$ from a line $b$—$b$ parallel with the axis of the bearing, and in which very high speeds of rotation are not required, the present improvement gives a less frictional resistance in the contact of the end of the roll against the thrust flange, without materially decreasing the steadying effect of the thrust of the roll against the flange, as compared with prior art bearings.

That result is attained because the spaced spots or surfaces of contact S in the conical locus of rotation of the axes of the rollers is so far outside of the cylindric locus of a line $b$—$b$ through the center of gravity $y$ of the roller, that the end thrust of the roller tends to deflect the smaller end of the roller inward as against the action of centrifugal force, and causes it to hug the bearing surface 10a of the cone, and to prevent any chattering of the roll which may otherwise occur.

Moreover, the widely spaced spots or surfaces of contact between the end of the roll and the rib of the thrust flange, not only gives the maximum resistance with a minimum of pressure, to a lateral deflection or displacement of the roll from its true axis, but the tangential contact of the rounded edge flat end of the roll against the rounded crest of the rib, reduces the frictional resistance and/or the grinding and wearing contact to a minimum.

The detachable retaining ring 14 preferably has its inner side offset to form an outwardly presented shoulder 14a, and a reversely positioned offset or shoulder 10b is provided in the periphery of the axial member of the bearing, which in the present embodiment is the smaller end of the cone, which latter offset or shoulder may be the outer side of an annular channel 10c formed in the periphery of the cone adjacent the ends of the peripheral raceway surface 10a of the cone.

The shoulder bore 14b of the ring extending inward from the shoulder 14a may be cylindrically formed, and the offset, annular, surface bore 14c of the ring extending outward from said shoulder may be likewise cylindrically formed, or may be slightly tapered and conically flared outwardly, as shown in the drawings; and the periphery of the smaller end of the cone is correspondingly shaped with a cylindric bottom 10d in the channel 10c and a conically flared offset, annular, surface portion 10e extending outward from the inwardly presented shoulder 10b.

The retaining ring is preferably made of spring steel from a coined or machined ring blank, with its inner side machined or otherwise formed to normally fit the corresponding peripheral portion of the small end of the cone; and the ring is severed or split at one side as at 14d, so that it may be expanded and contracted for engaging with and disengaging from the smaller end of the cone.

The severed ring may be placed in position and secured upon the cone by slipping it upon a tapered plug or mandrel (not shown) having its base abutted against the end of the cone, and then pressing the ring as by an annular ram or plunger, so as to expand it on the plug or mandrel and permit it to pass over the enlarged end portion of the cone until the shoulder on the ring passes the shoulder on the cone; whereupon the ring automatically contracts so as to fit the end portion of the mandrel, with an interlocking of the shoulders, which positively secures the ring in position.

In the modified form of ring and cone shown in Fig. 5, the inner side 14c' of the ring 14' and the periphery 10e' of the small end of the cone may be merely tapered and conically flared outward so as to give a wedging engagement of the ring upon the cone, without the positive interlocking engagement of shoulders in the preferred form.

It is evident that the improved form of bearing can be used in connection with a conventional cage 22, as shown in Fig. 5, because the thrust flange does not extend far beyond the conical locus of the axes of rotation of the rollers, and the retaining ring may be correspondingly reduced in diameter to make room for the cage; in which event the pintle 15 is omitted on the smaller end of the roller, all as shown in Fig. 5.

And it is evident that when the retaining ring is in place, the annular offset surface 10e of the axial member serves as a positive support for the annular offset surface 14c of the retaining ring, to sustain the ring from being deflected or tilted outward, when the shoulder 14a on the ring is in abutment with the shoulder 10b on the axial member.

I claim:—

1. A tapered roller bearing including a cone having an outer raceway surface, a cup having an inner raceway surface, a plurality of rollers rolling on and between the raceway surfaces, and a thrust flange fixed on the larger end of the cone and having an annular rib protruding inward from its rim, each roller having an end bearing against the crest of the rib at spots spaced a substantial distance on each side of the axis of the roll in the conical locus of the axes of rotation of the rollers, the same being outside the cylindric locus of a line through the center of gravity of the rollers parallel with the axis of the bearing.

2. A tapered roller bearing including a cone having an outer raceway surface, a cup having an inner raceway surface, a plurality of rollers rolling on and between the raceway surfaces, and a thrust flange fixed on the larger end of the cone and having a curved face annular rib protruding inward from its rim, each roller having an end bearing against the crest of the rib at spots spaced a substantial distance on each side of the axis of the roll in the conical locus of the axes of rotation of the rollers, the same being outside the cylindric locus of a line through the center of gravity of the rollers parallel with the axis of the bearing.

3. A tapered roller bearing including a cone having an outer raceway surface, a cup having an inner raceway surface, a plurality of rollers rolling on and between the raceway surfaces, and being substantially in contact with each other, and a thrust flange fixed on the larger end of the cone and having an annular rib protruding inward from its rim, each roller having an end bearing against the crest of the rib at spots spaced a substantial distance on each side of the axis of the roll in the conical locus of the axes of rotation of the rollers, the same being outside the cylindric locus of a line through the center of gravity of the rollers parallel with the axis of the bearing.

4. A tapered roller bearing including a cone having an outer raceway surface, a cup having an inner raceway surface, a plurality of rollers rolling on and between the raceway surfaces, and a thrust flange fixed on the larger end of the cone and having an annular rib protruding inward from its rim, each roller having an end bearing against the crest of the rib at spots spaced a substantial distance on each side of the axis of the roll in the conical locus of the axes of rotation of the rollers, the same being outside the cylindric locus of a line through the center of gravity of the rollers parallel with the axis of the bearing, and the end bearing surface of the roller being in a plane perpendicular to its axis.

5. A tapered roller bearing including a cone having an outer raceway surface, a cup having an inner raceway surface, a plurality of rollers rolling on and between the raceway surfaces, and a thrust flange fixed on the larger end of the cone and having an annular rib protruding inward from its rim, each roller having an end bearing against the crest of the rib at spots spaced a substantial distance on each side of the axis of the roll in the conical locus of the axes of rotation of the rollers, the same being outside the cylindric locus of a line through the center of gravity of the rollers parallel with the axis of the bearing, and the end bearing surface of the roller being in a plane perpendicular to its axis, and having a round peripheral edge.

6. A tapered roller bearing including a cone having an outer raceway surface, a cup having an inner raceway surface, a plurality of rollers rolling on and between the raceway surfaces, and a thrust flange fixed on the larger end of the cone and having an annular rib protruding inward from its rim, each roller having a flat end perpendicular to its axis with a rounded edge, bearing against the crest of the rib in the conical locus of the axes of rotation of the rollers, the same being outside the cylindric locus of a line through the center of gravity of the rollers parallel with the axis of the bearing, the end bearing of the roller being at two spaced spots on opposite sides of the plane through the axes of the bearing and the roller in the line of tangency of its flat end and rounded edge.

7. A roller bearing including an axial member having a peripheral raceway surface, a plurality of rollers rolling on the raceway surface, and a retaining ring on one end of the axial member, interlocking means between the member and retaining ring, said interlocking means including an annular channel forming an inwardly presented shoulder and an annular surface portion offset from said channel on said axial member and a cylindrical shoulder and an annular surface offset from said shoulder on said retaining ring bearing respectively upon the shoulder and the offset surface of the axial member, and the ring being severed at one side for expanding for placing it upon and detaching it from the axial member.

8. A roller bearing including an axial member having a peripheral raceway surface, a plurality of rollers rolling on the raceway surface, and a retaining ring on one end of the axial member, said retaining ring being provided with an annular groove, said rollers being provided with pintles received within said groove, the inner side of the ring and the periphery of the end of the axial member being shaped for engagement with each other, and the ring being severed at one side for expanding for placing it upon and detaching it from the axial member.

9. In a roller bearing having a cone and rollers provided with pintles, an annular roller retaining ring, said ring being provided with an annular groove receiving said roller pintles, said ring being provided with a cylindrical shoulder and an annular surface offset therefrom for engagement with said bearing cone, and the ring being severed at one side for expanding for placing it upon and detaching it from said cone.

10. A retaining ring for a roller bearing including an annular groove in one surface for receiving roller pintles, and a bore including a cylindrical shoulder and an annular surface offset therefrom for engagement with the bearing cone, and the ring being severed at one side for expanding for placing it upon and detaching it from the bearing cone.

DAVID A. WALTERS.